US007883073B2

(12) United States Patent
Sinka et al.

(10) Patent No.: US 7,883,073 B2
(45) Date of Patent: Feb. 8, 2011

(54) METHODS AND APPARATUS FOR ADJUSTING A SPRING LOAD IN AN ACTUATOR

(75) Inventors: Steven Paul Sinka, Butler, PA (US); Richard Peter Natili, Jr., Cecil, PA (US)

(73) Assignee: Emerson Process Management Power and Water Solutions, Inc., Pittsburgh, PA (US)

( * ) Notice: Subject to any disclaimer, the term of this patent is extended or adjusted under 35 U.S.C. 154(b) by 205 days.

(21) Appl. No.: 12/014,199

(22) Filed: Jan. 15, 2008

(65) Prior Publication Data

US 2009/0179168 A1 Jul. 16, 2009

(51) Int. Cl.
*F16K 31/44* (2006.01)

(52) U.S. Cl. ...................... 251/176; 251/214; 251/337; 277/522

(58) Field of Classification Search ................ 251/337, 251/214, 176; 277/522
See application file for complete search history.

(56) References Cited

U.S. PATENT DOCUMENTS 2,704,551 A * 3/1955 Ralston ...................... 251/337
3,035,596 A * 5/1962 Guinard ...................... 251/337
3,934,307 A 1/1976 Lasier et al.
4,018,243 A 4/1977 Dunbar
4,159,105 A 6/1979 Vander Laan et al.
4,457,501 A 7/1984 Davis
4,530,489 A 7/1985 Hirano et al.
4,540,860 A 9/1985 Odashima et al.
4,886,241 A * 12/1989 Davis et al. ................ 251/214
4,924,904 A 5/1990 Carter
5,277,344 A 1/1994 Jenkins
5,549,276 A * 8/1996 Pittman et al. ............. 251/214
5,601,276 A * 2/1997 Wordin ...................... 251/214
5,816,560 A 10/1998 Obser
6,042,081 A * 3/2000 Anderson ................. 251/61.5
6,155,290 A 12/2000 Nakajima et al.
6,176,256 B1 1/2001 Nakajima et al.
6,409,094 B2 6/2002 Tojo et al.
6,422,259 B1 7/2002 Moreno
6,546,913 B2 4/2003 Hopley (Continued)

FOREIGN PATENT DOCUMENTS

GB 2176874 1/1987

(Continued)

OTHER PUBLICATIONS

UK Intellectual Property Office, "UK Search Report" issued in connection with counterpart Great Britain Patent Application No. GB0823281.1, mailed Apr. 23, 2009, 3 pages.

*Primary Examiner*—John Bastianelli
(74) *Attorney, Agent, or Firm*—Hanley, Flight and Zimmerman, LLC

(57) ABSTRACT

Methods and apparatus for adjusting a spring load in an actuator are described. An example actuator includes a housing and a plate. Further, the example actuator includes one or more springs disposed in the housing to apply a force to the plate. Additionally, the example actuator includes a spring load adjuster having a collar extending through and movably engaged to the plate to enable an adjustment of the position of the collar relative to the plate to change a load provided by the one or more springs.

16 Claims, 5 Drawing Sheets

200 215 212 219 220 202 A A 218 214 208 217 224 216 213 224 210 222 224 204 206 225 226 206

U.S. PATENT DOCUMENTS 6,561,517 B2 * 5/2003 James ........................ 251/214
6,568,375 B2 5/2003 Ishikawa et al.
6,629,544 B2 10/2003 Nakajima et al.
6,647,802 B2 11/2003 Willson-Hackworth et al.
6,892,709 B2 5/2005 Hopley
6,895,995 B2 5/2005 Kirkman et al.
7,077,390 B2 7/2006 Miller et al.
7,082,963 B2 8/2006 Ando
2006/0208211 A1 * 9/2006 Bush et al. .................. 251/214
2007/0170387 A1 7/2007 Yamamoto et al.

FOREIGN PATENT DOCUMENTS

GB 2253893 9/1992
GB 2366830 3/2002

* cited by examiner

METHODS AND APPARATUS FOR ADJUSTING A SPRING LOAD IN AN ACTUATOR

FIELD OF THE DISCLOSURE

The present disclosure relates generally to actuators and, more particularly, to methods and apparatus for adjusting a spring load in an actuator.

BACKGROUND

Control valves are commonly used in systems to control the flow of a fluid (e.g., a gas, a liquid, etc.) or any other substance through pipes and/or vessels to which they are connected. A control valve is typically composed of one or more inlets and outlets, and includes a flow control element or member (e.g., a valve gate, a piston, a valve plug, a closure member, etc.) that operates to control fluid flow through apertures that fluidly couple the inlet(s) to the outlet(s). A flow control member is typically coupled to a valve bonnet assembly that is mechanically coupled (e.g., bolted, clamped, threaded into, etc.) to the valve body. Typically, the flow control member is configured to engage a sealing structure (e.g., a seat ring) that encompasses a flow path through the valve.

An actuator is typically coupled to the valve bonnet and includes an actuator stem that engages a valve stem to produce a torque and/or a thrust on the flow control member to control fluid flow through the valve. Actuators often include one or more springs that apply a biasing force to the actuator stem to move the flow control member to, for example, an open or closed condition in the absence of a control signal. The loading force provided by the spring(s) determines the position of the actuator stem and, thus, the position of any flow control member operatively coupled thereto for a given control signal. Additionally, for a given input or control signal, the spring load is set to achieve a target valve seat load when the valve is in a closed position and a target valve back seat load when the valve is in an open position.

When the valve actuator is manufactured, the spring(s) may be selected based on theoretical spring performance. However, due to manufacturing tolerances relating to springs and/or spring housing components, actual spring performance often deviates from theoretical spring performance, which may result in valve seat loads that are too low or too high. Insufficient or excessive valve seat loads can lead to improper valve operation. Depending on the deviation from the theoretical spring performance, the spring load can be increased or decreased in an attempt to achieve the target valve seat load and the target valve back seat load.

In some known actuators, to adjust for the discrepancy between the actual spring performance and the desired target or theoretical spring performance, it is necessary to disassemble the actuator to adjust the spring load by either adding or removing shims and/or spacers and then reassembling the actuator. After the actuator is reassembled, the actuator can be retested to determine if the actual spring performance provides the desired target valve seat load and the target valve back seat load. If not, the laborious process of disassembling the actuator to adjust the spring load must be repeated. Further, because shims and/or spacers are typically manufactured in specialized assembly shops in an other location from where the actuators are assembled and tested and an other location from where the actuators are installed, the customers or other users may not have the proper resources (e.g., proper tools, trained employees, etc.) to manufacture the shims and/or spacers to properly adjust the spring load.

DETAILED DESCRIPTION

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity.

The example apparatus and methods described herein may be used to adjust a spring load in an actuator. One example actuator described herein includes an example spring load adjuster, a housing, a plurality of tie rods, a first plate and a second plate. The housing may be positioned between the first plate and the second plate. The tie rods may be positioned substantially parallel to the exterior of the housing and may be coupled to the first plate and the second plate. In some examples, the spring load adjuster may include a collar that is at least partially concentric with an aperture in the first plate, adjusters, and locking devices. A rim of the collar may engage at least one of a plurality of springs (i.e., a biasing element), which may be contained in the housing.

In one example actuator, the example spring load adjuster may be coupled to the first plate via at least one or more adjusters. Further, the spring load adjuster may include one or more locking devices that may engage a face of the first plate. To adjust the spring load, the locking devices may be loosened and the one or more adjusters may be adjusted. Adjusting the one or more adjusters changes the distance between the spring load adjuster and the first plate and, thus, changes the spring load as described in greater detail below. The adjuster(s) may be used to make a substantially continuous adjustment to the spring load. The collar may be substantially locked (i.e., fixed) into place relative to the first plate by engaging at least one of the locking devices with the first plate. Engaging at least one of the locking devices with the first plate may prevent vibration, caused by operating conditions, from loosening the adjusters.

In an alternative example actuator, an alternative example spring load adjuster includes a collar with a threaded exterior surface to engage a threaded aperture of a first plate of the actuator. Further, the spring load adjuster may include one or more locking devices to engage a face of the first plate to substantially lock or fix the collar relative to the first plate. To adjust the spring load, the one or more locking devices are loosened and the collar is rotated. Rotating the collar changes the distance between a flange of the collar and the first plate and, thus, changes the spring load as described in greater detail below. Again, the collar may be used to make a substantially continuous adjustment to the spring load. The collar may be substantially locked (i.e., fixed) into place relative to the first plate by engaging at least one of the one or more locking devices with the first plate.

Figure 1:
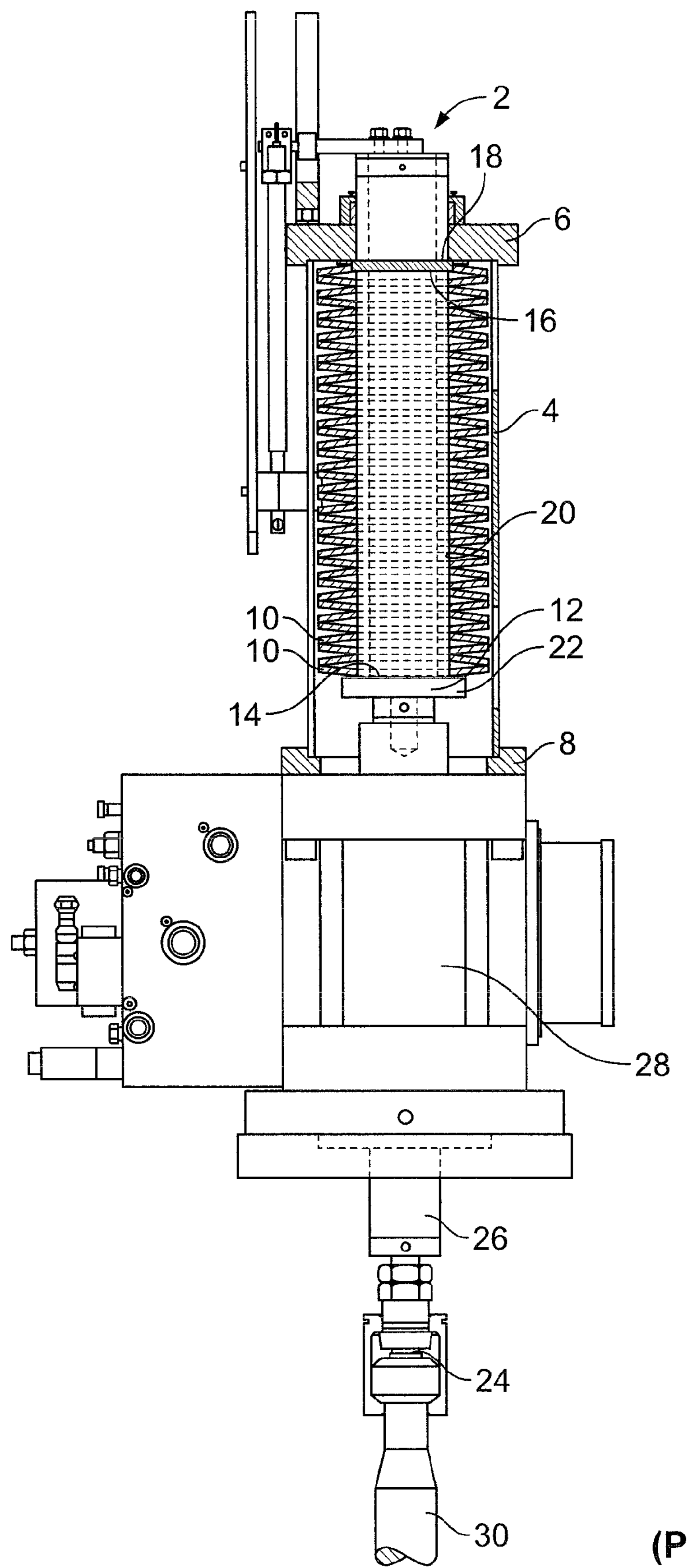
FIG. 1 shows an enlarged cross-sectional view of a known actuator.

FIG. 1 shows an enlarged cross-sectional view of a known actuator 2. FIG. 1 depicts the relationship between a spring housing 4, an outboard plate 6, and an inboard plate 8. The spring housing 4 is positioned between the outboard plate 6 and the inboard plate 8.

The spring housing 4 contains a plurality of disc springs 10 and a plunger 12. The plurality of disc springs 10 are substantially coaxial relative to the central axis of the spring housing 4. Each of the plurality of disc springs 10 includes a respective one of a plurality of an apertures (not shown). A face of the springs 10 engages a face 14 of the plunger 12. Further, a face of at least one of the springs 10 engages a face 16 of at least one of a plurality of spacers or shims 18. The plunger 12 has a cylindrical portion 20 and a flange 22. The cylindrical portion 20 of the plunger 12 is at least partially surrounded by the apertures of the springs 10. The plunger 12 is operatively coupled to an adapter 24 via a piston rod 26 and other actuator components (not shown) contained in a hydraulic cylinder 28. An end of a valve stem 30 may be operatively coupled to the actuator 2 via the adapter 24.

As pressure (e.g., hydraulic pressure) changes within the hydraulic cylinder 28, the springs 10 compress or expand and the plunger 12 and the adapter 24 move to a designated position. The springs 10 provide a spring load and, when the adapter 24 is coupled to the stem of a valve, are configured to provide a valve seat load in a valve closed position and a valve back seat load in a valve open position for various pressures. It may be necessary to adjust the spring load of the actuator 2 of FIG. 1 to achieve target or desired load values when the actual spring load deviates from a theoretical desired load. To adjust the spring load, it is necessary to disassemble the actuator 2, add or remove shims or spacers 18, and then reassemble the actuator 2. After the actuator 2 is reassembled, the actuator 2 can be retested to determine if the actual spring performance provides the target valve seat loads. If the target values are not attained after the adjustment, the disassembly process may be repeated. In addition, the shims or spacers 18 are typically manufactured in an other location from where the actuators are assembled and tested and an other location from where the actuators are installed and, thus, the customer, the field technician, etc. may not have the proper resources (e.g., proper tools, trained employees, etc.) to manufacture the shims or spacers 18 and/or to otherwise adjust the spring load.

Figure 2:
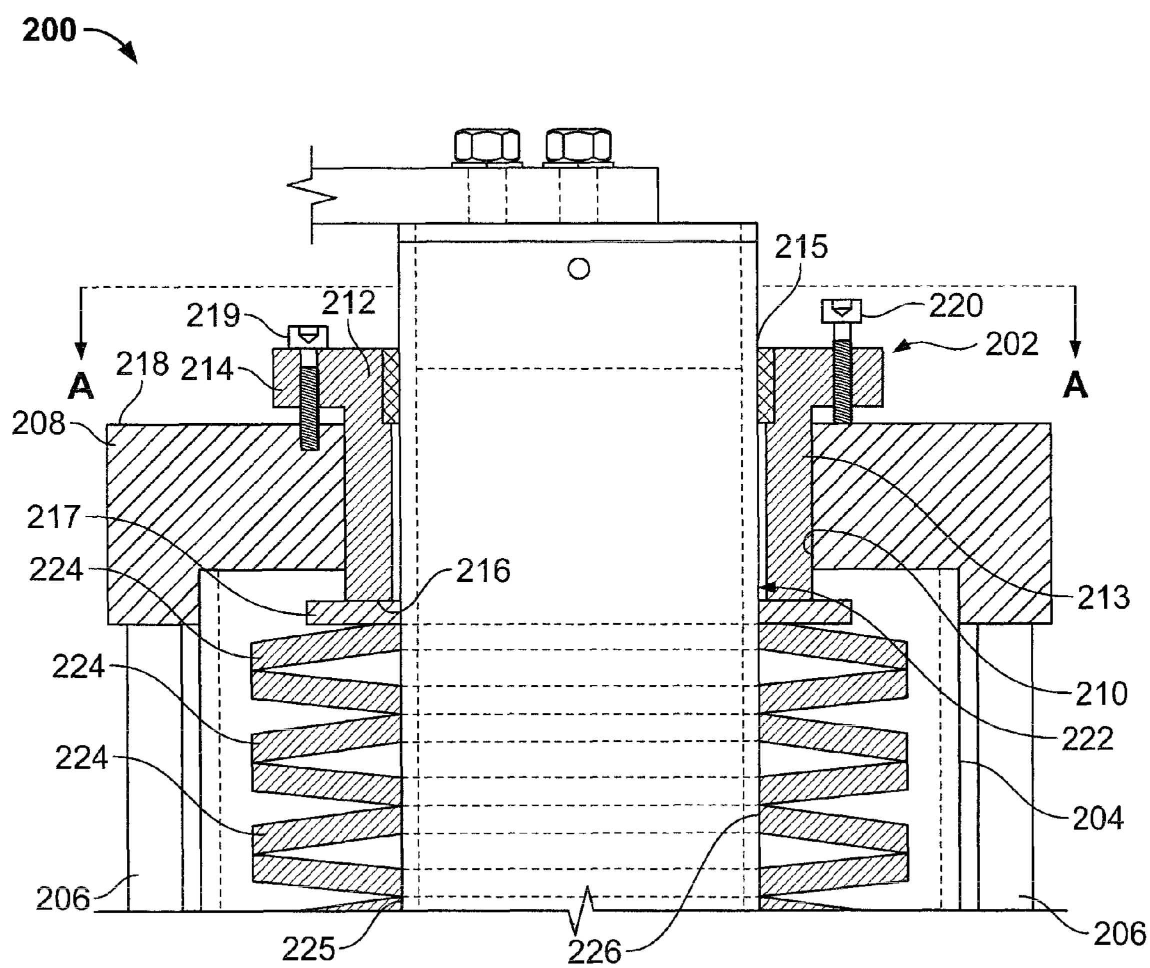
FIG. 2 shows an enlarged cross-sectional view of a portion of an example actuator including an example spring load adjuster.
Figure 3:
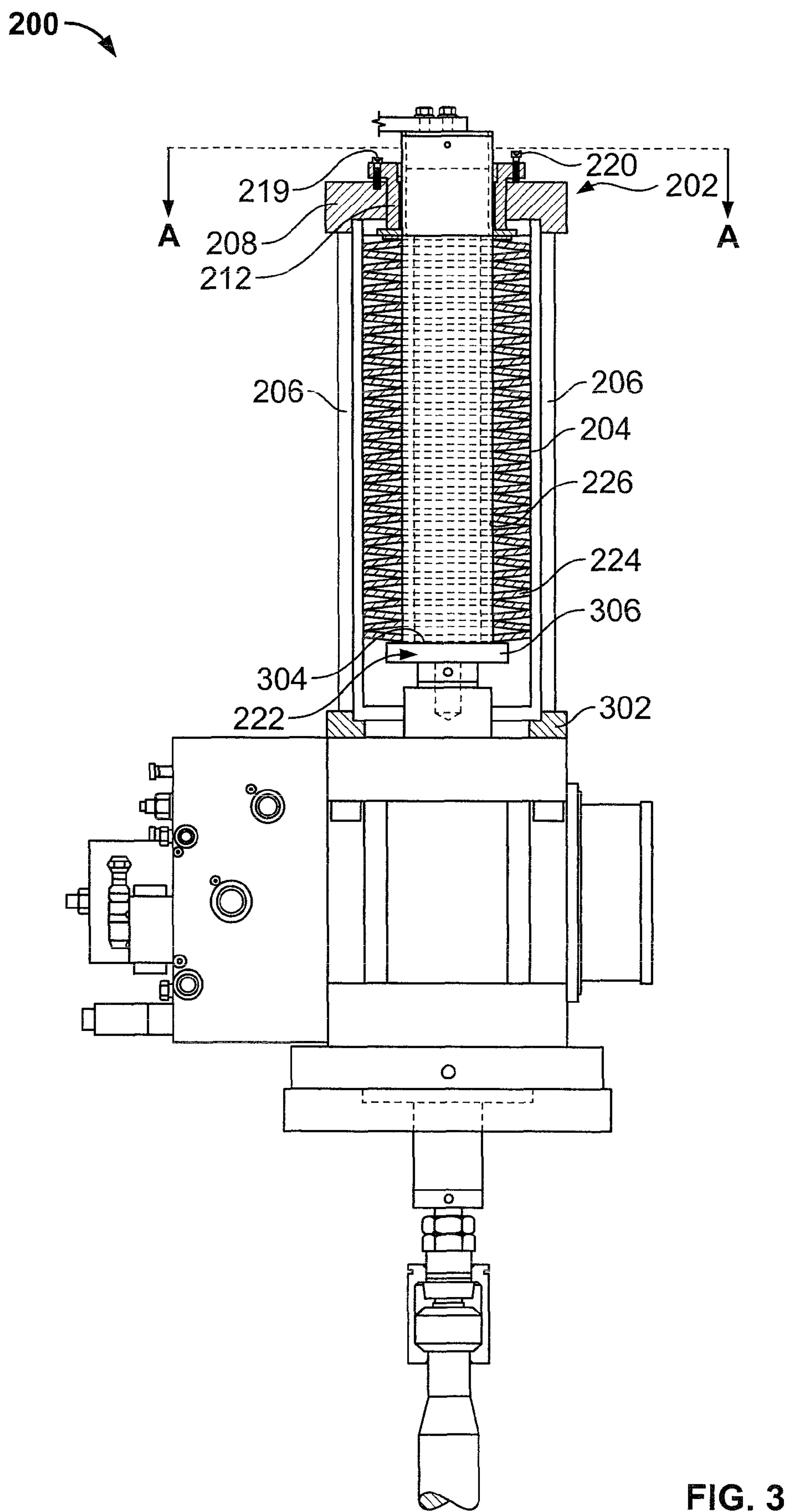
FIG. 3 shows a cross-sectional view of the example actuator including the example spring load adjuster of FIG. 2.
Figure 4:
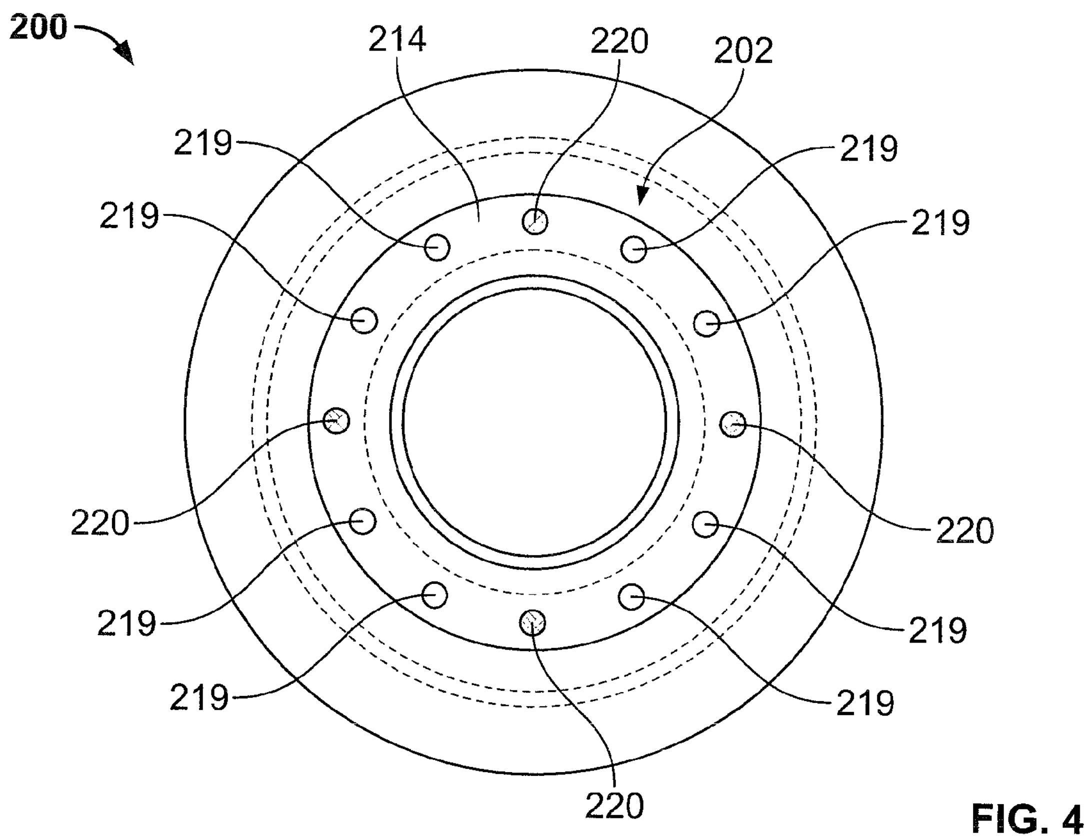
FIG. 4 shows a top view of the example actuator including the example spring load adjuster of FIG. 2.

FIG. 2 shows an enlarged cross-sectional view of a portion of an example actuator 200 including an example spring load adjuster 202; FIG. 3 shows a cross-sectional view of the example actuator 200 including the spring load adjuster 202 of FIG. 2; and FIG. 4 shows a top view of the example actuator 200 including the example spring load adjuster 202 of FIG. 2. The example actuator 200 may be coupled to any suitable valve (not shown) such as, for example, any valve requiring a biasing spring for fail-safe operation, a ball valve, a butterfly valve, a sliding stem valve, a plug valve, etc. Further, while the example actuator 200 is illustrated as a spring-extend actuator, the example actuator 200 is not limited to the specific examples described herein. For example, the example actuator 200 may be a spring-retract actuator, etc.

The example actuator 200 may also include a housing 204, a plurality of tie rods 206, a first plate 208, and a second plate 302 (FIG. 3). The housing 204 may be, for example, a spring housing and may be positioned between the first plate 208 and the second plate 302 (FIG. 3). Each of the plurality of tie rods 206 may be coupled at one of its ends to the first plate 208 and at the other of its ends to the second plate 302 (FIG. 3). At least one of the plurality of tie rods 206 may be positioned substantially parallel to the housing 204. Any number of tie rods 206 (e.g., 1, 3, 4, 5, 6, etc.) may be used. The first plate 208 may include an aperture 210 that may be, for example, positioned substantially in the center of the first plate 208. The spring load adjuster 202 may include a movable collar 212 that may extend through the first plate 208. The collar 212 may be comprised of a cylindrical portion or sleeve 213 and a flange 214 at an opening 215. The collar 212 may slidingly engage the aperture 210 of the first plate 208. A rim 216 of the collar 212 may engage a washer 217 (e.g., a hardened washer, etc.) and may be coaxial relative to the washer 217. The flange 214 may be substantially parallel to a face 218 of the first plate 208. FIG. 3 clearly depicts the relationship between the housing 204, the plurality of tie rods 206, the first plate 208, the second plate 302, and the collar 212.

The spring load adjuster 202 may include one or more adjusters 219 to couple the collar 212 to the first plate 208. The plurality of adjusters 219 may be implemented using any suitable adjuster such as, for example, pull down screws, pins, studs, or any other device to change or adjust the position of the collar 212 relative to the first plate 208 as described in greater detail below. Each of the plurality of adjusters 219 may have a threaded portion that engages a threaded portion of the collar 212 and/or the first plate 208. Further, the spring load adjuster 202 may include one or more locking devices 220 that may engage the face 218 of the first plate 208. The locking devices 220 may be implemented using any suitable locking device such as, for example, jacking screws, retaining screws, or any other device(s) to fasten, retain, or fix the position of the collar 212 relative to the first plate 208 in at least in one direction as described below. The locking devices 220 may have a threaded portion to engage a threaded portion of the collar 212. Further, the locking devices 220 may extend through the collar 212 and engage and/or drive against the first plate 208. FIG. 4 depicts the relationship between the plurality of adjusters 219, the locking devices 220, and the collar 212. Although eight adjusters 219 are shown in the illustrated examples, any number of adjusters (e.g., 1, 2, 3, 4, 5, etc.) may be included instead. Further, although four locking devices 220 are shown in the illustrated examples, any number of locking devices (e.g., 1, 2, 3, 4, 5, etc.) may be included instead. Further, the adjusters 219 and the locking devices 220 may be arranged at varying distances relative to and at various angles about the longitudinal axis of the actuator 200.

Turning to FIG. 2, the housing 204 may include a plunger 222 and one or more springs 224. The plurality of springs 224 may be annular and may be substantially coaxial relative to the housing 204. The springs 224 may be substantially concentric relative to at least a portion of the plunger 222, and an exterior surface 225 of the plunger 222 may act as a guide for the springs 224. The plunger 222 may have a cylindrical portion or sleeve 226 and a flange 306 (FIG. 3). Further, at least one of the springs 224 may be housed within the housing 204, and one or more of the springs 224 may include an aperture that surrounds at least a portion of the plunger 222. The example springs 224 may be implemented using a plurality of Belleville-type disc springs stacked in a series arrangement, though any suitable spring(s) such as, for example, a plurality of coil springs in a parallel-arrangement, a plurality of coil springs in a nested-spring arrangement, a single coil spring, etc. may be used instead.

A face of at least one of the springs 224 engages a face of the washer 217, and a face of at least another one of the springs 224 (where there are at least two springs) or another face of the at least one spring 224 (where there is one spring) engages a face 304 (FIG. 3) of the plunger 222, etc. The springs 224 provide a spring load that may be configured to achieve a target or desired valve seat load in a valve closed position and a target or desired valve back seat load in a valve open position (i.e., target load values). When the actuator 200 is manufactured, depending on the design specifications and/or target load values, the spring(s) 224 may be selected based on a theoretical spring performance (i.e., how the spring(s) 224 should theoretically perform in the actuator 200). However, due to manufacturing tolerances, actual spring performance (i.e. how the spring(s) 224 actually perform in the actuator 200 when the actuator 200 is assembled) may deviate from the theoretical spring performance and, as a result, the spring load may need to be adjusted to substantially achieve the target load values or desired spring load(s).

To adjust the spring load of the example actuator 200, the locking devices 220 may be loosened (e.g., the locking devices 220 may be rotated to disengage from the first plate 208) and the plurality of adjusters 219 may be adjusted (e.g., turned or rotated). In this example, when the locking devices 220 are loosened and the adjusters 219 are adjusted, the collar 212 may be moved relative to (e.g., toward or away from) the first plate 208. More specifically, the collar 212 may be moved by rotating, twisting, pulling, sliding or otherwise moving the collar 212 relative to the first plate 208. The spring load adjuster 202 may be adjusted by any means such as, for example, by hand, with a tool, etc. The adjusters 219 may be adjusted to continuously move the collar 212 to a desired position relative to the first plate 208 where the desired position may correspond to the target load values. In the example of FIG. 2, as the plurality of adjusters 219 are tightened, the flange 214 of the collar 212 is continuously moved toward the first plate 208 and the rim 216 of the collar 212 is continuously moved away from the first plate 208 to compress the spring(s) 224 and, thus, increase the spring load. On the other hand, loosening the plurality of adjusters 219 allows the flange 214 to continuously move away from the first plate 208 and the rim 216 and the washer 217 to continuously move toward the first plate 208, which allows the spring(s) 224 to expand and the spring load to decrease.

The collar 212 may be substantially locked (i.e., substantially secured) in a desired adjustment position by tightening at least one of the plurality of locking devices 220 so that the locking devices 220 engage the first plate 208 and fix (e.g., retain, restrict, etc.) the collar 212 relative to the first plate 208 in at least one direction. In this example, the position of the locking devices 220 determines how close the flange 214 of the collar 212 may move toward the first plate 208. In some example implementations, movement of the adjusters 219 when the locking devices 220 do not engage the first plate 208 and the adjusters 219 are coupled to the collar 212 and the first plate 208 makes a continuous adjustment of the position of the collar 212 relative to the plate 208 that affects a continuous setting of the spring load provided by the springs 224. The continuous adjustment and/or the continuous setting may be implemented via, for example, a plurality of incremental changes, a plurality of incremental adjustments, a plurality of fine adjustments, etc. At least one of the plurality of adjusters 219 and/or at least one of the plurality of locking devices 220 may be externally accessible (i.e., accessible from the exterior of the actuator 200) to enable adjustment of the spring load without disassembly of the actuator 200.

If one or more of the adjusters 219 is coupled to the collar 212 and the first plate 208, the spring load may not substantially decrease or substantially increase even if other of the adjusters 219 and/or the locking devices 220 are loose (i.e. do not engage the first plate 208).

Figure 6:
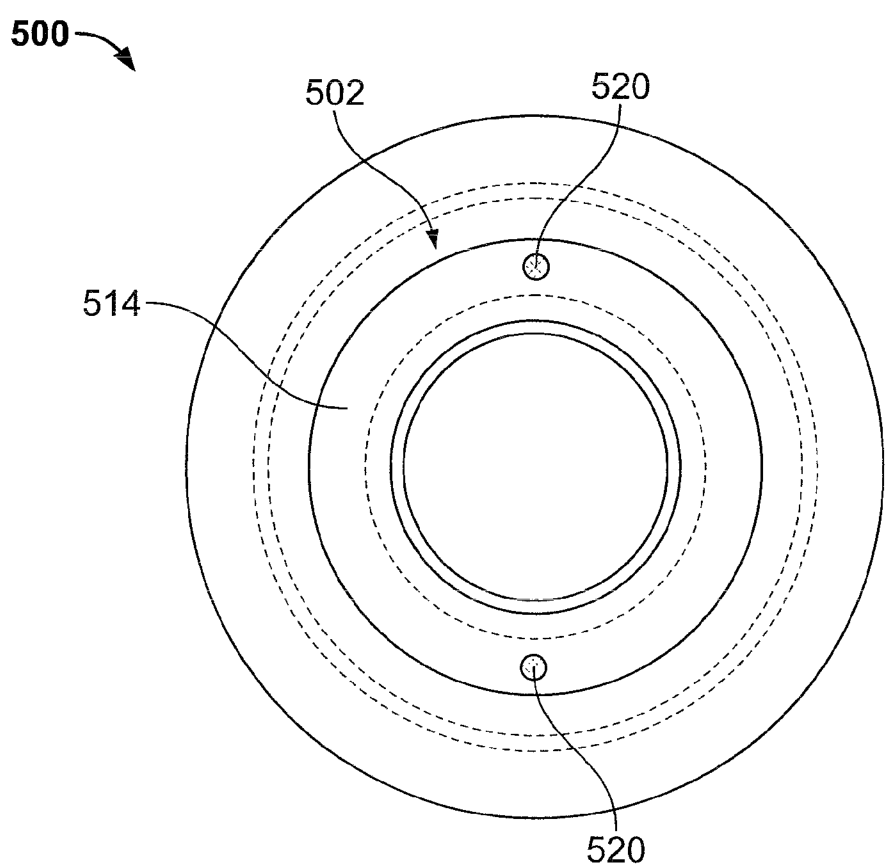
FIG. 6 shows a top view of the alternative example actuator including the alternative example spring load adjuster of FIG. 5.
Figure 5:
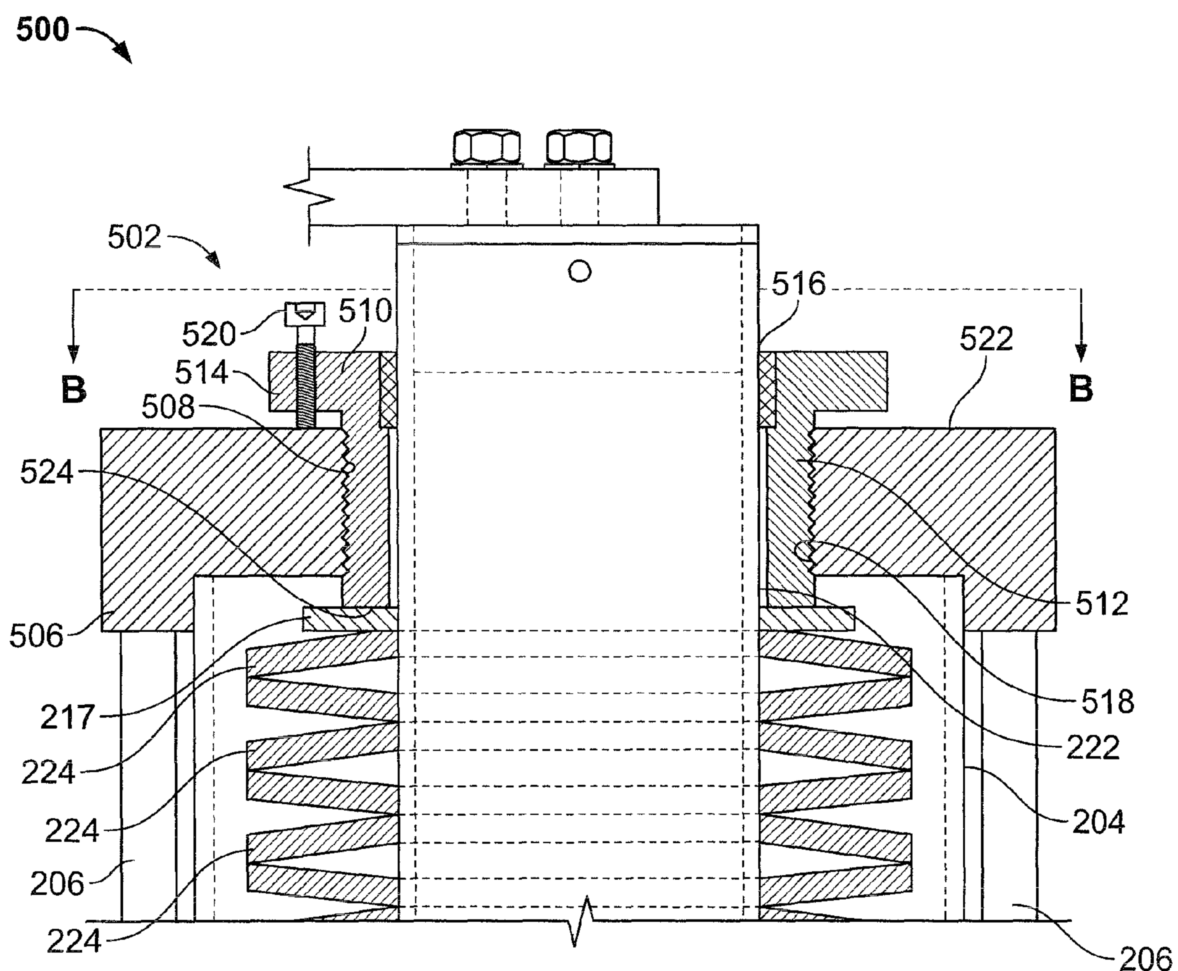
FIG. 5 shows an enlarged cross-sectional view of an alternative example actuator including an alternative example spring load adjuster.

FIG. 5 shows an enlarged cross-sectional view of a portion of an alternative example actuator 500 including an alternative example spring load adjuster 502, and FIG. 6 is a top view of the example actuator 500 including the example spring load adjuster 502 of FIG. 5. The example actuator 500 may be coupled to any suitable valve (not shown) such as, for example, any valve requiring a biasing spring for fail-safe operation, a ball valve, a butterfly valve, a sliding stem valve, a plug valve, etc. Further, while the example actuator 500 is illustrated as a spring-extend actuator, the example actuator 500 is not limited to the specific examples described herein, for example, the example actuator 500 may be a spring-retract actuator (not shown), etc. The housing 204 of FIG. 5 may include a structure similar to the structure described above in the example actuator 200 of FIGS. 2 and 3. Reference numbers in FIG. 5 that are the same as those used in FIGS. 2 and 3 correspond to structures that are similar or identical to those described in connection with FIGS. 2 and 3.

The example actuator 500 may also include the housing 204, the plurality of tie rods 206, a first plate 506, and the second plate 302 (FIG. 3). The first plate 506 may include a threaded aperture 508 that may be, for example, positioned substantially in the center of the first plate 506. The spring load adjuster 502 may include a movable collar 510 that may extend through the first plate 506. The collar 510 may be comprised of a cylindrical portion or sleeve 512 and a flange 514 at an opening 516. The collar 510 also includes a threaded exterior surface 518 that engages the threaded aperture 508 of the first plate 506, which together act as an adjuster.

The spring load adjuster 502 may include one or more locking devices 520 that may engage the face 522 of the first plate 506. The locking devices 520 may be implemented using any suitable locking device such as, for example, jacking screws, retaining screws, or any other device(s) to fasten, retain, or fix the position of the collar 510 relative to the first plate 506 in at least one direction as described below. The locking devices 520 may have a threaded portion to engage a threaded portion of the collar 510. Further, the locking devices 520 may extend through the collar 510 and engage and/or drive against the first plate 506. FIG. 6 depicts the relationship between the plurality of locking devices 520 and the collar 510. Although two locking devices 520 are shown in the illustrated example, any number of locking devices (e.g., 1, 2, 3, 4, 5, etc.) may be included instead. Further, the locking devices 520 may be arranged at varying distances relative to and at various angles about the center of the actuator 500.

Turning to FIG. 5, to adjust the spring load of the example actuator 500, the locking devices 520 may be loosened (e.g., the locking devices 520 may be rotated to disengage from the first plate 506) and the collar 510 may be adjusted (e.g., turned or rotated) relative to the first plate 506. The spring load adjuster 502 may be adjusted by any means such as, for example, by hand, with a tool, etc. Adjusting the collar 510 may move the collar 510 relative to the first plate 506 to a desired position relative to the first plate 506, where the desired position may correspond to the target spring load values. In the example of FIG. 5, as the collar 510 is tightened (e.g., rotated clockwise), the flange 514 of the collar 510 is continuously moved toward to the first plate 506 and a rim 524 of the collar 510 is continuously moved away from the first plate 506 to compress the spring(s) 224 and, thus, increase the spring load. On the other hand, loosening the collar 510 allows the flange 514 to move away from the first plate 506 and the rim 524 and the washer 217 to move toward the first plate 506, which allows the spring(s) 224 to expand and the spring load to decrease.

The collar 510 may be substantially locked (i.e., substantially secured) into a desired adjustment position by tightening at least one of the plurality of locking devices 520 so that the locking devices 520 engage the first plate 506 and fix the collar 510 relative to the first plate 506 in at least in one direction. In this example, the position of the locking devices 520 determines how close the flange 514 of the collar 510 may move toward the first plate 506. In some example implementations, movement (e.g., rotation) of the collar 510 when the locking devices 520 do not engage the first plate 506 makes a continuous adjustment of the position of the collar 510 relative to the first plate 506 that affects a continuous setting of the spring load provided by the springs 224. The continuous adjustment and/or the continuous setting may be implemented via, for example, a plurality of incremental changes, a plurality of incremental adjustments, a plurality of fine adjustments, etc. At least one of the plurality of locking devices 520 and/or the collar 510 may be externally accessible (i.e., accessible from the exterior of the actuator 500) to enable adjustment of the spring load without disassembly of the actuator 500.

The example apparatus and methods described herein can be used to adjust a spring load in an actuator. The examples described herein may save time and simplify the assembly and testing of an actuator. The described examples may enable a person to adjust a spring load of an actuator without disassembling the actuator to access the spring(s) and without having to add/or remove shims, spacers or any other components including custom or specially made parts. Further, the locking devices described herein may ensure that inadvertent adjustment of the actuator spring load does not occur.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An actuator for use with a valve, the actuator comprising:

a housing;

a plate defining an aperture therethrough and coupled at an end of the housing;

a plunger positioned at least partially within the housing, the plunger to be operatively coupled to a stem of the valve;

one or more springs disposed in the housing and at least partially surrounding the plunger, the one or more springs to apply a force to the plunger;

a spring load adjuster having a collar at least partially surrounding the plunger and extending through the aperture to operatively engage the one or more springs, the collar movable relative to the plate to enable an adjustment of the position of the collar relative to the plate to change a load provided by the one or more springs to the stem or a seat of the valve; and at least one locking device extending through the collar to fix the position of the collar relative to the plate.

2. An actuator as defined in claim 1, wherein the locking device is externally accessible.

3. An actuator as defined in claim 1, wherein the collar is movably coupled to the plate.

4. An actuator as defined in claim 1, further comprising one or more fasteners to movably couple the collar to the plate.

5. An actuator as defined in claim 1, wherein the at least locking device comprises at least one threaded member threadably engaging and extending through a flange of the collar, the at least one threaded member having an end to drive against a face of the plate to fix the position of the collar relative to the plate in at least one direction.

6. An actuator as defined in claim 1, wherein the adjustment of the position of the collar relative to the plate is a substantially continuous adjustment.

7. An actuator as defined in claim 1, wherein the at least one locking device is accessible without having to disassemble the actuator.

8. An actuator as defined in claim 1, wherein the spring load adjuster is externally accessible to enable changing the position of the collar without having to disassemble the actuator.

9. An actuator as defined in claim 1, wherein the spring load adjuster comprises at least one of a screw, a pin, a stud, or a pull down screw extending through the collar and coupled to the plate to enable the position of the collar to be changed relative to the plate.

10. An actuator as defined in claim 1, wherein the collar threadably engages the plate so that rotation of the collar relative to the plate changes the position of the collar relative to the plate.

11. An actuator for use with a valve, the actuator comprising:

a housing;

first and second plates between which the housing is positioned, the first plate defining an aperture therethrough;

a plunger at least partially positioned in the housing and to be operatively coupled to a stem of the valve;

one or more springs disposed in the housing to apply a force to the plunger;

a spring load adjuster having a collar at least partially surrounding the plunger and extending through the aperture of the first plate, an end of the collar to operatively engage the one or more springs so that movement of the collar relative to the first plate changes the position of the collar relative to the first plate and changes a load provided by the one or more springs to the stem or a seat of the valve; and at least one threaded member threadably engaging and extending through a portion of the collar, the at least one threaded member having an end to drive against a face of the first plate to fix the position of the collar relative to the first plate in at least one direction.

12. An actuator as defined in claim 11, further comprising one or more adjusters that extend through a portion of the collar and threadably engage the first plate so that rotation of the one or more adjusters enables a position of the collar to change relative to the first plate.

13. An actuator as defined in claim 11, wherein the at least one threaded member is externally accessible.

14. An actuator as defined in claim 11, wherein the spring load adjuster is externally accessible to enable changing the position of the collar without having to disassemble the actuator.

15. An actuator as defined in claim 11, wherein the plunger and the one or more springs are coaxially aligned.

16. An actuator as defined in claim 11, wherein the collar threadably engages the plate so that rotation of the collar relative to the plate changes the position of the collar relative to the plate.

* * * * *